United States Patent [19]
Saraceno et al.

[11] Patent Number: 5,826,163
[45] Date of Patent: Oct. 20, 1998

[54] REMOVAL OF TECHNETIUM IMPURITIES FROM URANIUM HEXAFLUORIDE

[75] Inventors: Anthony J. Saraceno, Waverly; Keith D. Banks, Lucasville, both of Ohio

[73] Assignee: United States Enrichment Corporation, Bethesda, Md.

[21] Appl. No.: 860,000

[22] Filed: May 21, 1997

[51] Int. Cl.$^6$ .................................................... C01G 43/06
[52] U.S. Cl. ................................................ 423/258; 423/3
[58] Field of Search ........................ 423/3, 258; 210/682; 976/376; 376/189

[56] References Cited

U.S. PATENT DOCUMENTS

| | | | |
|---|---|---|---|
| 3,806,576 | 4/1974 | Carles et al. ............................ | 423/258 |
| 3,848,048 | 11/1974 | Moore ..................................... | 210/682 |
| 5,613,186 | 3/1997 | Larson et al. .......................... | 210/682 |

OTHER PUBLICATIONS

Milford, "Engineering Design of Oak Ridge Fluoride Volatility Pilot Plant" Ind. & Eng. Chem., vol. 50, No. 2, pp. 187–191, Feb. 1958.

Smiley et al, "Removal of Impurities from Uranium Hexafluoride by Selective Sorption Techniques", Trans. of Am. Nucl. Soc., vol. 10, No. 2, p. 507, Nov. 1967.

*Primary Examiner*—Ngoc-Yen Nguyen
*Attorney, Agent, or Firm*—David G. Beck; Townsend and Townsend and Crew

[57] ABSTRACT

Processes for the removal of technetium from contaminated uranium hexafluoride containing technetium, typically as technetium-99 ($^{99}$Tc) in nominal chemical forms are provided. The processes involve contacting the contaminated liquefied uranium hexafluoride with a metal fluoride, typically magnesium fluoride (MgF$_2$), for a period of time sufficient for the technetium to become adsorbed onto the metal fluoride thereby producing a purified uranium hexafluoride liquid; and removing the purified uranium hexafluoride liquid from the metal fluoride having adsorbed technetium.

12 Claims, 3 Drawing Sheets

5,826,163

REMOVAL OF TECHNETIUM IMPURITIES FROM URANIUM HEXAFLUORIDE

This invention was made with Government support under Contract No. USEC-96-C-0001, awarded to the United States Enrichment Corporation. The Government has certain rights in this invention.

FIELD OF THE INVENTION

The present invention relates to methods of purifying uranium hexafluoride by removing technetium-99 impurities.

BACKGROUND OF THE INVENTION

Technetium-99 ($^{99}$Tc) is a contaminant that is typically present in an enriched $UF_6$ product in low concentrations. This contaminant originates from the fission of $^{235}$uranium and is contained in reactor return uranium. Process equipment surfaces in gaseous diffusion plants which process $UF_6$ hold the $^{99}$Tc as one or more volatile compounds which are slowly released over time. As a result, the enriched $UF_6$ product which is withdrawn from diffusion plants invariably contains low concentrations of $^{99}$Tc, due to a slow leaching from equipment surfaces. The concentrations of the $^{99}$Tc impurity, although low, may easily exceed product specification limits, making the uranium hexafluoride product unacceptable to fuel fabricators. Presently, the specification limit for $^{99}$Tc in $UF_6$ product is only 0.2 $\mu g/g$ $^{235}$U or, assuming 5% $^{235}$U enrichment, 0.010 $\mu g$ $^{99}$Tc/g U (0.010 ppm, U basis).

Methods for the removal of $^{99}$Tc from $UF_6$ have typically involved gas phase operation (contacting gaseous $UF_6$ with a metal fluoride, typically magnesium fluoride adsorbent). These methods are not effective at the low $^{99}$Tc concentrations which impact customer acceptance. For example, the lowest concentrations amenable to gas phase removal are above 0.1 $\mu g$ $^{99}$Tc/g U. Additionally, sufficient throughput must be maintained to provide adequate quantities of the purified $UF_6$. The throughput for $UF_6$ processing which can be obtained with gas phase operations is only about 100–500 lbs/ft$^2$/hour. If the gas velocity is increased to increase $UF_6$ processing rates, $^{99}$Tc removal efficiency decreases sharply. Conversely, if gas velocity is decreased to maintain high $^{99}$Tc removal, processing rates suffer. In short, existing methods (gaseous $UF_6$ with $MgF_2$ adsorbent) are insufficient to combine both high removal efficiency of $^{99}$Tc for direct control at concentrations applicable to market acceptance, and high $UF_6$ processing rates to produce an economic process without burdensome equipment size.

What is needed in the art are new methods of removing $^{99}$Tc from uranium hexafluoride which overcome the problems associated with existing methods. The present invention provides such processes.

SUMMARY OF THE INVENTION

The present invention provides processes for the removal of technetium from contaminated uranium hexafluoride containing technetium, typically technetium-99 which is present in several chemical forms or compounds. Some common volatile forms are pertechnetyl fluoride ($TcO_3F$), technetium hexafluoride ($TcF_6$) and technetium oxytetrafluoride ($TcOF_4$). Less volatile forms of technetium include $TcO_2$ and $TcF_4$ or $TcF_5$. Volatility is a relative property and depends upon the temperature of the process. It is generally the $^{99}$Tc compounds which are volatile at $UF_6$ handling temperatures that are present in the $UF_6$ product.

The processes of the present invention involve:

(a) contacting contaminated uranium hexafluoride in liquid form with a solid metal fluoride, typically magnesium fluoride ($MgF_2$) for a period of time sufficient for the technetium to become adsorbed onto the metal fluoride solid thereby producing a purified uranium hexafluoride liquid; and (b) removing the purified uranium hexafluoride liquid from the solid metal fluoride, typically magnesium fluoride solid having adsorbed technetium.

DETAILED DESCRIPTION OF THE INVENTION

Figure 1:
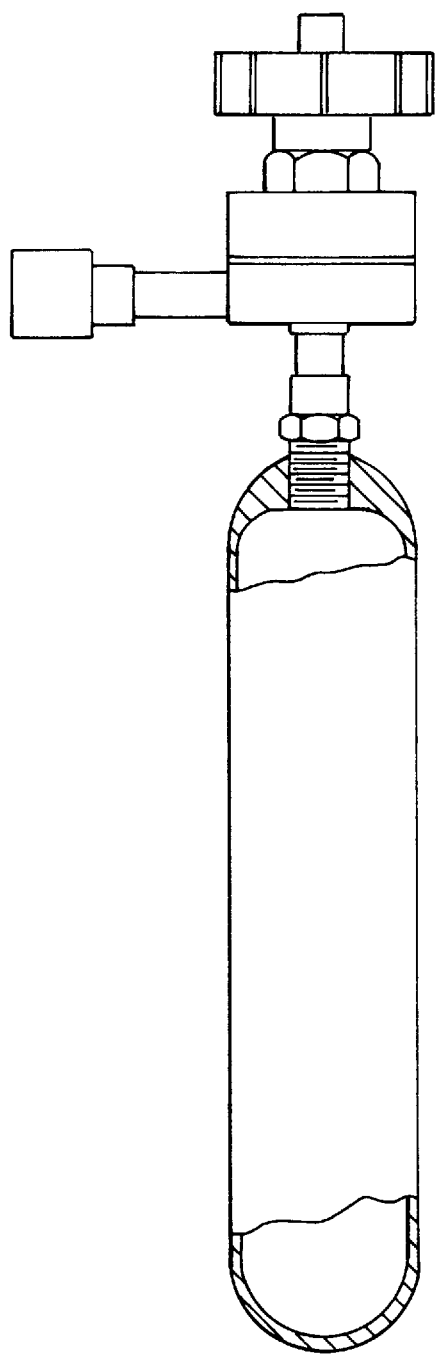
FIG. 1 illustrates a $UF_6$ cylinder "1S" which is used in the Examples.

This invention disclosure describes a process modification which leads to unexpectedly large improvement in the removal of $^{99}$Tc from $UF_6$. The process reduces $^{99}$Tc in $UF_6$ to below product specification levels for $UF_6$ and further provides high $UF_6$ throughputs. The methods described herein can be applied to control the removal of $^{99}$Tc at $UF_6$ product withdrawal stations and/or $UF_6$ liquid transfer facilities on a scale that is attractive for installation at uranium enrichment plants.

As noted in the Background, existing technology employs magnesium fluoride ($MgF_2$) in the form of pellets which are placed in a reactor. Uranium hexafluoride is passed through the reactor in the gas phase at atmospheric pressures or less. Gas phase operation in itself is inherently limiting in $UF_6$ throughputs or processing rates. Furthermore, this mode of operation fails to perform efficiently as $^{99}$Tc concentrations decrease. The lower concentration limit for useful removal and/or control of $^{99}$Tc varies with gas velocity and is estimated to be above 0.1 $\mu g/g$ U and probably much higher. (A typical result in gas phase operation at 2 psia is 2.2 $\mu g/g$ being reduced by 59% to 0.9 $\mu g/g$). It is not possible to obtain $UF_6$ processing rates above about 500 lbs/ft$^2$/hour at atmospheric pressure or below and still achieve acceptable reduction at concentration below 0.1 $\mu g/g$ U.

The present invention is based on the surprising discovery that when liquid $UF_6$ (rather than gaseous $UF_6$) is passed through a trap containing solid $MgF_2$, a remarkable boost in $^{99}$Tc removal efficiency is realized at low $^{99}$Tc concentrations. As one example, at an initial concentration 0.018 $\mu g/g$ U, $^{99}$Tc is reduced to 0.0008 $\mu g/g$ U. In other demonstration tests, reductions to below the detection limit (0.0004 $\mu g/g$ U) are readily obtained. These high efficiencies were not expected considering the state of the art for $MgF_2$ trapping technology. Furthermore, $UF_6$ processing rates are well over 3000 lbs/ft$^2$/hour. Rates as high as 4600 lbs/fts$^2$/hour have been successfully demonstrated with no apparent decrease in efficiency. These rates have considerable economic impact as it is now feasible to install a reasonably sized $^{99}$Tc removal apparatus at any existing product withdrawal station or $UF_6$ liquid transfer facility without significantly interfering with present operations. Accordingly, direct control of $^{99}$Tc in $UF_6$ product is possible and results in further cost savings due to greater flexibility of diffusion operations.

The highly purified $UF_6$ product which is obtained using the methods herein, further assures customer acceptance of the $UF_6$ product.

EMBODIMENT OF THE INVENTION

In view of the above surprising discovery, the present invention provides in one aspect a process for removal of technetium ($^{99}Tc$), from contaminated uranium hexafluoride containing the technetium. This process comprises:

(a) contacting the contaminated uranium hexafluoride in liquid form with a metal fluoride in solid form for a period of time sufficient for the technetium to become adsorbed onto the metal fluoride thereby producing a purified uranium hexafluoride liquid; and (b) removing the purified uranium hexafluoride liquid from the solid metal fluoride having adsorbed technetium.

The present invention utilizes $UF_6$ in liquid form to achieve the significant results provided in the Examples below. Uranium hexafluoride is a volatile white crystalline solid which melts at about 64°–65° C., but which sublimes at about 56°–57° C. under pressure of about 1 atmosphere. Accordingly, liquified uranium hexafluoride can be obtained under pressure of about 1.5 atmospheres and at working temperatures (typically provided in cylinders). Uranium hexafluoride also reacts vigorously with water and care should be taken to remove air and moisture from the trapping system.

Metal fluorides which are suitable for the removal of technetium from $UF_6$ are generally high melting ionic solids with very low solubility in $UF_6$. A particularly preferred metal fluoride is magnesium fluoride ($MgF_2$) which is recognized for its technetium removal properties. However, other metal fluorides can also be used, such as $AlF_3$, transition metal fluorides such as $NiF_2$ and related high melting fluorides which are solids at temperatures at which $UF_6$ begins to melt to a liquid. In other embodiments, the metal fluoride used in the invention can be a combination of different metal fluorides (e.g.,. a combination of $MgF_2$ and $AlF_3$).

Figure 2:
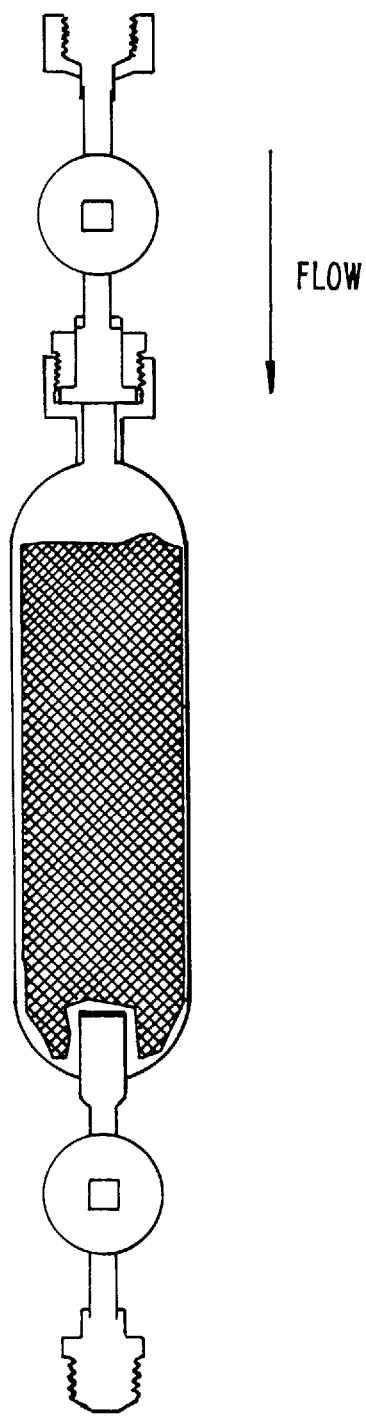
FIG. 2 shows a liquid $UF_6$ filtering apparatus containing 8–12 mesh $MgF_2$ as an adsorbent and a 10 micron filter.
Figure 3:
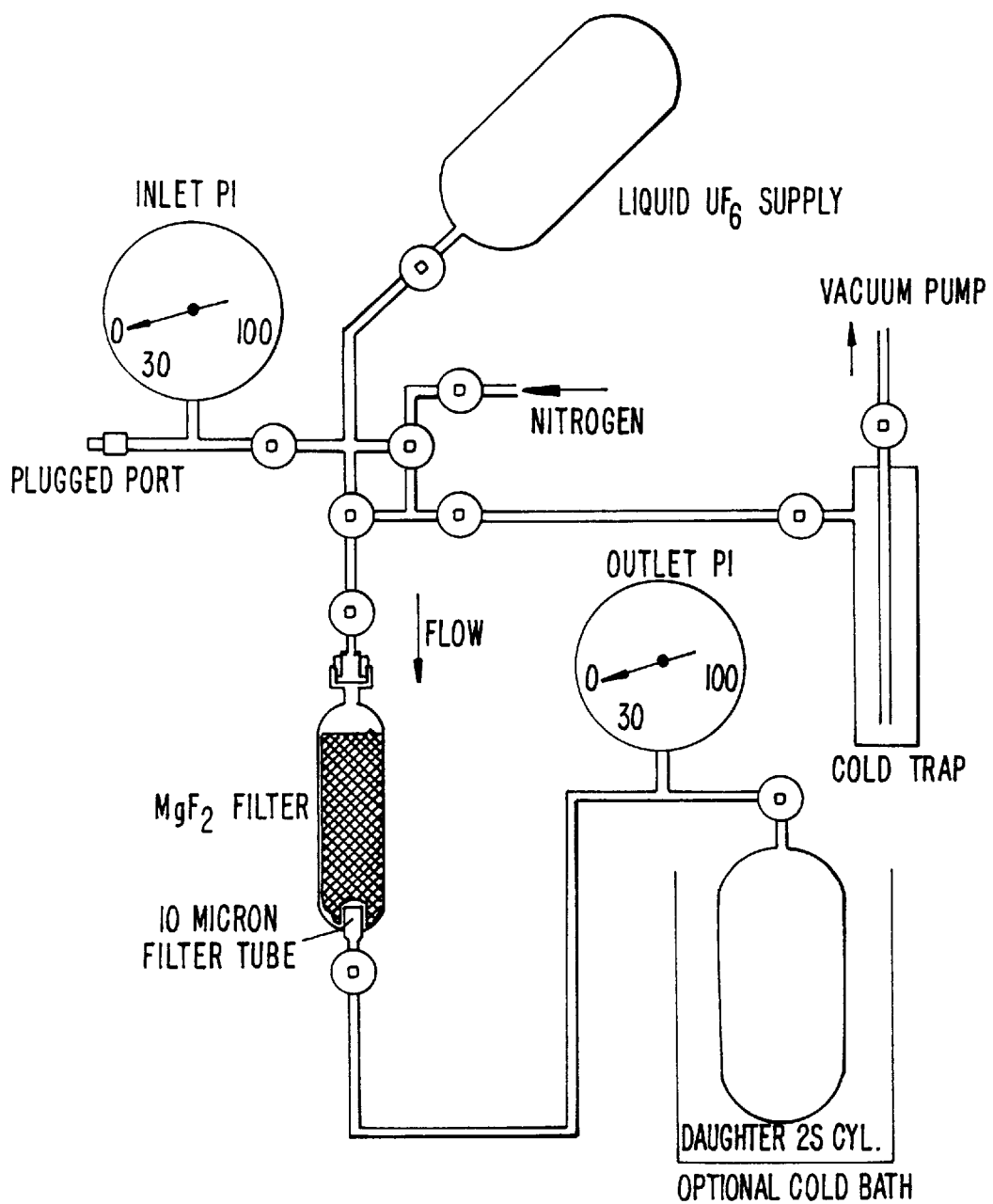
FIG. 3 illustrates a vacuum manifold system for filtering liquid $UF_6$ and trapping the purified $UF_6$ in a cooled collection vessel.

The method of contacting the contaminated uranium hexafluoride with a metal fluoride typically involves placing a metal fluoride chemical trap in the $UF_6$ flow line extending from the source of $UF_6$ to a suitable receptacle for purified $UF_6$. FIGS. 1–3 provide illustrations of the types of apparatus which can be used in the present invention. One of skill in the art will understand that other apparatuses could also be used to provide the necessary contact between liquid $UF_6$ and the metal fluoride. By allowing the contaminated uranium hexafluoride to pass through, for example, a $MgF_2$ chemical trap, contact is made between the $MgF_2$ and the contaminated $UF_6$, and technetium impurities are adsorbed onto the $MgF_2$. Particular flow rates and contact times (between liquid $UF_6$ and $MgF_2$) will be dependent on the system requirements and capabilities. The examples below provide an indication of flow rates and contact times (or residence times) for a system comprising a "2S" or "1S" feed cylinder of $UF_6$, a $MgF_2$ chemical trap constructed from a "1S" cylinder body, and an attached "2S" cold trap. For this system, a flow rate of about $1.0\times10^{-5}$ $ft^3$/sec to about $3.5\times10^{-5}$ $ft^3$/sec is useful. These flow rates result in chemical trap residence (or contact) times of about 350 seconds to about 100 seconds. Other filters and chemical traps which operate on this same premise, including those versions which are of a larger or smaller scale and of greater or lesser trap voidage, will be known to those of skill in the art.

The amount and physical form (specific surface area and pellet size) of the metal fluoride used in the chemical traps will be dependent on a number of factors including the amount of $UF_6$ to be purified, the size of the trap and the flow rate required. In one group of embodiments, the metal fluoride is $MgF_2$ which is in the form of pellets, preferably about ⅛ inch to about ⅜ inch pellets, more preferably about ¼ inch pellets. In other embodiments, the magnesium fluoride is in the form of 6–15 mesh, preferably 8–12 mesh. The amount of magnesium fluoride used will depend on the level of contamination of $UF_6$ with $^{99}Tc$. Typically, magnesium fluoride will adsorb up to about 0.03 g $^{99}Tc$ per g $MgF_2$. Periodic monitoring of the chemical trap contents will determine whether the chemical trapping agent, $MgF_2$, is in need of replacement.

Following contacting the contaminated $UF_6$ with the metal fluoride chemical trap, the resultant purified liquid $UF_6$ is removed from the trap. Typically, in a flow-through system, the removal occurs as a matter of course as the liquid $UF_6$ (first contaminated, then purified) is pumped or transferred through the system. Accordingly, attached to the effluent port of the chemical trap is a cold trap for containing the purified $UF_6$. The cold trap is typically a cylinder for longer term storage of the purified $UF_6$ which is immersed in a cold temperature bath, for example a liquid nitrogen bath (–196° C.). In a flow-through system the direction of liquid flow may be vertically upward or downward. Alternative modes of liquid-solid contact are also useful, including co-current, countercurrent and unicurrent flow of the liquid and solid phases. The unicurrent flow implies one of the phases is fixed, while the other is mobile. Both phases can be temporarily fixed (no flow) and either one of the two phases is then removed at a later time.

The following examples are offered solely for the purposes of illustration, and are intended neither to limit nor to define the invention.

EXAMPLES

A set of tests was designed to test the removal of $^{99}Tc$ from liquid $UF_6$ utilizing a $MgF_2$ chemical trap. The tests consisted of transferring liquid $UF_6$, containing a high concentration of $^{99}Tc$ through a chemical trap and cold trapping the outlet of the trap. The trap contents were varied and a duplicate trap was operated for comparison. The outlet cold traps were subsampled and analyzed for $^{99}Tc$ and the results evaluated for $^{99}Tc$ removal efficiencies.

Trap Construction

Two identical $MgF_2$ chemical traps were constructed using "1S" cylinder bodies (see FIG. 1). Both ends were drilled and a 10 micron filter (see FIG. 2) was silver soldered into the outlet of the traps. A cajon fitting was silver soldered to the inlet, which allowed access to the trap interior to facilitate trapping material changeouts. The 10 micron filter kept trapping material from contaminating the $UF_6$. The traps were pressure checked at 200 psig, leak checked and passivated with fluorine. The traps were wrapped with a heat tape and connected to a Variac to control temperature at ~100° C.

Test Procedure

Testing was conducted using a vacuum manifold system typically used for liquid $UF_6$ subsampling. The trap was connected to the cajon fitting used for subsampling $UF_6$ cylinders. Tubing extended from the outlet end of the trap to a "2S" container immersed in a liquid nitrogen bath. The liquid $UF_6$ was supplied in "2S" containers. The following steps were used in each test conducted.

1. Liquified "2S" feed cylinder.
2. Attached cold trap "2S" to manifold

3. Attached liquified "2S" feed cylinder to manifold
4. Pressure and leak checked apparatus
5. Applied liquid nitrogen to cold trap
6. Initiated liquid $UF_6$ flow through filter
7. Maintained established pressure limits
8. Recorded transfer time and pressures
9. Subsampled filtered $UF_6$
10. Analyzed filtered (purified) $UF_6$ for $^{99}Tc$.

Control—Filter Test

The control test is a preliminary filter test in which no $MgF_2$ trapping media is used. The test is used to determine the amounts of $^{99}Tc$ which can be removed on a 10 micron filter in the absence of any trapping media. The test was conducted on traps 1 and 2 with the feed cylinder heel. The traps were washed and the liquid was sent for $^{99}Tc$ analysis.

PRELIMINARY TEST RESULTS

| Trap No. | Tc Inlet* Concentrations | Tc Outlet* Concentrations | % Tc Removal |
|---|---|---|---|
| Trap #1 | 0.488 | 0.429 | 12.1 |
| Trap #2 | 0.560 | 0.510 | 8.9 |

*µg Tc/g $^{235}U$

| | Wash Solutions | |
|---|---|---|
| Trap No. | Feed "2S"* Wash | Filter* Wash |
| Trap #1 | 0.966 | 1.266 |
| Trap #2 | 1.56 | 0.741 |

*µg Tc Total

As can be seen from the above data, the 10 micron filters were not effective in trapping $^{99}Tc$ from liquid $UF_6$. The average percent of $^{99}Tc$ removal from the liquid $UF_6$ was about 10 percent with equal amounts of $^{99}Tc$ found in the filters and the feed cylinders. This indicated no selective removal of $^{99}Tc$ by the filter in the empty trap.

EXAMPLE 1

This example illustrates the effectiveness of a $MgF_2$ trapping agent in removing $^{99}Tc$ from liquid uranium hexafluoride.

Test Number 1

The chemical traps were cleaned and filled with ¼" $MgF_2$ pellets that were manufactured at the Portsmouth Gaseous Diffusion Plant in Piketon, Ohio. The filters were evacuated to a vacuum with heat applied, then treated with fluorine several times to remove excess water.

The inlet $UF_6$ pressure was throttled at 30 psig.

RESULTS - TEST NUMBER 1

$MgF_2$ FILTER TEST #1

| Trap No. | Transfer Wt. Gms. | Tc Inlet* Concentrations | Tc Outlet* Concentrations | µg Tc Removed | Tc % Removal |
|---|---|---|---|---|---|
| Trap #1 | 1494 | 0.429 | 0.0285 | 20.1 | 93.5 |
| Trap #2 | 1729 | 0.51 | 0.219 | 14.2 | 57.5 |

*µg Tc/g $^{235}U$

As the above data indicates, the traps removed $^{99}Tc$ in much greater amounts than the controls. The amounts removed in Traps #1 and #2 differed significantly, however. The inequality may have been due to the difference in weight of $MgF_2$ in the traps.

EXAMPLE 2

This example illustrates the impact of unequal weights of $MgF_2$ on the ability of the traps to sequester $^{99}Tc$. In view of the results in Example 1, this test utilized equal amounts of $MgF_2$ in the two traps.

Test Number 2

Two traps were loaded equally with 40 grams of ¼" $MgF_2$ pellets, then heated, evacuated, and fluorinated as described above. A pressure gauge was added to the outlet line of the traps. The pressure differentials were recorded to indicate any pressure drop occurring through the $MgF_2$ trap. The flow rate of the liquid $UF_6$ was estimated to be $1.62 \times 10^{-5}$ ft$^3$/sec and the residence time was about 306 seconds.

RESULTS - TEST NUMBER 2

$MgF_2$ FILTER TEST #2

| Trap No. | Transfer Wt. Gms. | Tc Inlet* Concentrations | Tc Outlet* Concentrations | µg Tc Removed | Tc % Removal |
|---|---|---|---|---|---|
| Trap #1 | 2036 | 0.437 | 0.078 | 20.5 | 82.3 |
| Trap #2 | 1741 | 0.440 | 0.198 | 11.7 | 55.2 |

*µg Tc/g $^{235}U$

The average flow rate of the liquid $UF_6$ was estimated to be $3.32 \times 10^{-5}$ ft$^3$/sec and the residence time was 150 seconds. The traps again behaved differently with resultant Tc removal very similar to the results of Test Number 1. The trap material was removed and the interior of the trap inspected by a video probe to verify that there was no difference in the trap construction. The inequality in Tc removal efficiency may be the result of the ¼" pellets allowing channelling through the 1½" diameter trap body. A subsequent test was established to determine if a smaller mesh $MgF_2$ would provide more consistent results.

EXAMPLE 3

This example illustrates the use of 8–12 mesh $MgF_2$ for the removal of $^{99}Tc$ from liquid $UF_6$.

Test Number 3

In this test the two traps were each loaded with 106 grams of 8–12 mesh $MgF_2$. The traps were evacuated under heat and fluorinated as described above.

RESULTS - TEST NUMBER 3

MgF2 FILTER TEST #3
Smaller Pellets 8–12 Mesh

| Trap No. | Weight (grams) | Tc Inlet* Concentrations | Tc Outlet* Concentrations | µg Tc Removed | Tc % Removal |
|---|---|---|---|---|---|
| Trap #1 | 1816 | 0.379 | 0.0286 | 18.4 | 92.6 |
| Trap #2 | 1648 | 0.3906 | 0.0174 | 19.6 | 95.6 |

*µg Tc/g $^{235}U$

The increased surface area and bed density of the small mesh $MgF_2$ produced consistent $^{99}Tc$ trapping efficiency of greater than 90 percent. The flow rates of the liquid $UF_6$ through the traps was estimated at $3.1 \times 10^{-5}$ ft$^3$/sec and did not seem to be affected by the smaller mesh size of the $MgF_2$.

EXAMPLE 4

This example illustrates the trapping consistency of the system in Example 3, through several cylinders of $UF_6$.

Test Number 4

Testing was continued by running several "2S" containers of $UF_6$ through trap #2 to determine consistency of $^{99}Tc$ removal efficiency. It must be noted that the trap experienced a wet-air inleakage following cooldown after Test Number 3 (above). The gasket was changed and Test Number 4 was conducted.

RESULTS - TEST NUMBER 4

$MgF_2$ FILTER TEST #4

| Cylinder Number | Transfer Wt. Gms. | Tc Inlet* Concentrations | Tc Outlets* Concentrations | μg Tc Removed | Tc % Removal |
|---|---|---|---|---|---|
| 2 | 1690 | 0.219 | 0.039 | 8.61 | 82.5 |
| 3 | 1687 | 0.198 | 0.029 | 8.1 | 85.5 |
| 4 | 1607 | 0.0174 | 0.035 | −0.85 | No Removal |

*μg Tc/g $^{235}U$

More than 80 percent of the $^{99}Tc$ was removed in two of the test cylinders. However, this amount is 10% less than the results seen in Test Number 3. The flow rate of the liquid $UF_6$, was estimated at $3.65 \times 10^{-5}$ ft$^3$/sec and the residence time was 136 seconds. The wet-air inleakage may have affected the results. More $UF_6$ may have hydrolyzed on water sites of the $MgF_2$ pellets taking up sites for $^{99}Tc$ trapping to occur. Cylinder 4 was tested to see how the $MgF_2$ would remove even low level $^{99}Tc$ from liquid $UF_6$. The $^{99}Tc$ outlet concentrations were the same as previous tests which was apparently due to release of material from previous tests. However, the results could indicate sampling and detection errors at such low levels of technetium.

EXAMPLE 5

This example illustrates the removal of $^{99}Tc$ from four cylinders of $UF_6$ containing different concentrations of the contaminant.

Test Number 5

Test Number 5 consisted of running four more cylinders of $UF_6$ through trap #2. The gaskets were changed as a precaution. The trap was evacuated after $UF_6$ from each cylinder was passed through the trap.

Four cylinders containing several different concentrations of $^{99}Tc$ were used for this test.

RESULTS - TEST NUMBER 5

FILTER 2

| Cylinder Number | Transfer Wt. Gms. | Tc Inlet* Concentrations | Tc Outlets* Concentrations | μg Tc Removed | Tc % Removal |
|---|---|---|---|---|---|
| 5 | 1568 | 0.465 | <0.02 | 9.6 | 95.8 |
| 6 | 1469 | 0.408 | 0.016 | 9.7 | 96.1 |
| 7 | 1909 | 0.19 | <0.008 | 11.8 | 95.8 |
| 8 | 301 | 1.40 | 0.021 | 5.7 | 98.6 |

*μg Tc/g $^{235}U$

Trap #2 removed 96% of the $^{99}Tc$ from the four cylinders of $UF_6$. The flow rate of the liquid $UF_6$ was estimated at $3.38 \times 10^{-5}$ ft$^3$/sec and the residence time was 146 seconds. The trapping efficiency discrepancies seen in earlier tests were probably a result of the wet-air inleakage experienced when the filter cooled and the aluminum gasket loosened. As a precaution the gaskets were changed and the trap was immediately evacuated and buffered with nitrogen for the remaining tests.

EXAMPLE 6

This example illustrates the efficiency of the present method using twelve cylinders of contaminated $UF_6$.

Test Number 6

Twelve "2S" cylinders containing 1.303 μg Tc/g $^{235}U$ were trapped consecutively in this test. The trap was evacuated after each cylinder was transferred. Trap #2 was used with the same trapping media as used in the previous tests.

RESULTS - TEST NUMBER 6

| Cylinder Number | Transfer Wt. grams | Inlet μg Tc/g $^{235}U$ | Outlet μg Tc/g $^{235}U$ | μg $^{99}Tc$ Removed | Percent Removal |
|---|---|---|---|---|---|
| 9 | 1213 | 1.303 | 0.011 | 47.2 | 99.2 |
| 10 | 1449 | 1.303 | 0.011 | 56.3 | 99.2 |
| 11 | 1187 | 1.303 | 0.015 | 46.0 | 98.9 |
| 12 | 1248 | 1.303 | 0.013 | 48.4 | 99.0 |
| 13 | 1132 | 1.303 | 0.018 | 43.8 | 98.6 |
| 14 | 2181 | 1.303 | 0.009 | 85.0 | 99.3 |
| 15 | 1195 | 1.303 | 0.020 | 46.1 | 98.5 |
| 16 | 1352 | 1.303 | 0.009 | 52.7 | 99.3 |
| 17 | 1199 | 1.303 | 0.009 | 46.7 | 99.3 |
| 18 | 1160 | 1.303 | 0.025 | 44.6 | 98.1 |
| 19 | 1799 | 1.303 | 0.031 | 68.8 | 97.6 |
| 20 | 1542 | 1.303 | 0.016 | 59.7 | 98.8 |
| | 16,657 | | | 645.3 | |

The 12 test cylinders used in this test had ≈99% of the $^{99}Tc$ removed. The results were consistent at the 98–99% removal efficiency for the total 16,659 grams of $UF_6$. The flow rate of the liquid $UF_6$ was estimated to be $4.13 \times 10^{-5}$ ft$^3$/sec and the residence time was 120 seconds.

The total $^{99}Tc$ contained in chemical trap #2, after a total of 20 "2S" cylinders were filtered, was theoretically 718 μg Tc. The high percentage removal of Tc indicates that saturation was not approached. These results further indicate that $UF_6$ contact with $MgF_2$ is more important than flow rates and residence time within the boundaries of our tests. This series of tests has demonstrated that with the 8–12 mesh $MgF_2$ and a trap bed of 106 grams in the 7×1½ inch chambers in excess of 28 Kg of $UF_6$, were successfully stripped of $^{99}Tc$.

All publications, patents and patent applications mentioned in this specification are herein incorporated by reference into the specification to the same extent as if each individual publication, patent or patent application was specifically and individually indicated to be incorporated herein by reference.

Although the foregoing invention has been described in some detail by way of illustration and example for purposes of clarity of understanding, it will be obvious that certain changes and modifications may be practiced within the scope of the appended claims.

What is claimed is:

1. A process for the removal of technetium from contaminated liquefied uranium hexafluoride containing said technetium, said process comprising;
   (a) contacting said contaminated liquefied uranium hexafluoride with metal fluoride in solid form for a period of time sufficient for said technetium to become adsorbed onto said metal fluoride thereby producing a purified uranium hexafluoride liquid; and
   (b) removing said purified uranium hexafluoride liquid from said metal fluoride having adsorbed technetium.

2. A process in accordance with claim 1, wherein said technetium is technetium-99.

3. A process in accordance with claim 1, wherein said metal fluoride is magnesium fluoride in the form of pellets.

4. A process in accordance with claim 1, wherein said metal fluoride is magnesium fluoride in the form of 1/8" to 3/8" pellets.

5. A process in accordance with claim 1, wherein said metal fluoride is magnesium fluoride in the form of 8–12 mesh pellets.

6. A process in accordance with claim 1, wherein said metal fluoride is present in a trap and is treated with fluorine prior to said contacting step (a).

7. A process in accordance with claim 1, wherein the rate of $UF_6$ processing is at least 500 lbs/ft$^2$/hour.

8. A process in accordance with claim 1, wherein the rate of $UF_6$ processing is at least 3000 lbs/ft$^2$/hour.

9. A process in accordance with claim 1, wherein the rate of $UF_6$ processing is at least 4600 lbs/ft$^2$/hour.

10. A process in accordance with claim 1, wherein said purified uranium hexafluoride liquid contains less than about 0.1 µg technetium/g uranium.

11. A process in accordance with claim 1, wherein said purified uranium hexafluoride liquid contains less than about 0.01 µg technetium/g uranium.

12. A process in accordance with claim 1, wherein said purified uranium hexafluoride liquid contains less than about 0.001 µg technetium/g uranium.

* * * * *